(12) United States Patent
Sugiyama

(10) Patent No.: US 10,819,141 B2
(45) Date of Patent: Oct. 27, 2020

(54) POWER SOURCE DEVICE

(71) Applicant: JTEKT CORPORATION, Osaka-shi, Osaka (JP)

(72) Inventor: Toyoki Sugiyama, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 83 days.

(21) Appl. No.: 16/270,924

(22) Filed: Feb. 8, 2019

(65) Prior Publication Data

US 2019/0252909 A1 Aug. 15, 2019

(30) Foreign Application Priority Data

Feb. 15, 2018 (JP) ................. 2018-025279

(51) Int. Cl.
*H02J 9/06* (2006.01)
*H02J 7/00* (2006.01)
*H02J 7/34* (2006.01)
*B62D 5/04* (2006.01)
*H02P 27/06* (2006.01)

(52) U.S. Cl.
CPC .............. *H02J 9/061* (2013.01); *B62D 5/046* (2013.01); *B62D 5/0481* (2013.01); *H02J 7/0068* (2013.01); *H02J 7/345* (2013.01); *B62D 5/0463* (2013.01); *B62D 5/0484* (2013.01); *H02P 27/06* (2013.01)

(58) Field of Classification Search
CPC .......... H02J 9/061; H02J 7/0068; H02J 7/345; H02J 9/06; H02J 7/00; H02J 7/34; B62D 5/046; B62D 5/0481; B62D 5/0463; B62D 5/0484; B62D 5/04; H02P 27/06
See application file for complete search history.

(56) References Cited

U.S. PATENT DOCUMENTS

| 2011/0203869 | A1 | 8/2011 | Tanaka et al. |
|---|---|---|---|
| 2013/0099759 | A1 | 4/2013 | Ura |
| 2014/0117884 | A1 | 5/2014 | Sugiyama et al. |
| 2014/0222294 | A1 | 8/2014 | Sugiyama et al. |

FOREIGN PATENT DOCUMENTS

JP  2014-091343 A  5/2014

OTHER PUBLICATIONS

Jul. 5, 2019 extended Search Report issued in European Patent Application No. 19157293.2.

*Primary Examiner* — Robert L Deberadinis
(74) *Attorney, Agent, or Firm* — Oliff PLC

(57) ABSTRACT

A power steering system includes: a main power source; an auxiliary power source connected to the main power source via a power source switch; a charge circuit connected to the main power source via the power source switch and configured to charge the auxiliary power source on the basis of the main power source; a switching circuit that switches a power supply mode; and a unit that turns off the power source switch after the auxiliary power source is charged by the charge circuit until the voltage of the auxiliary power source becomes equal to or more than a predetermined voltage in the case where the voltage of the auxiliary power source is less than the predetermined voltage when a key switch for a vehicle is turned off.

6 Claims, 5 Drawing Sheets

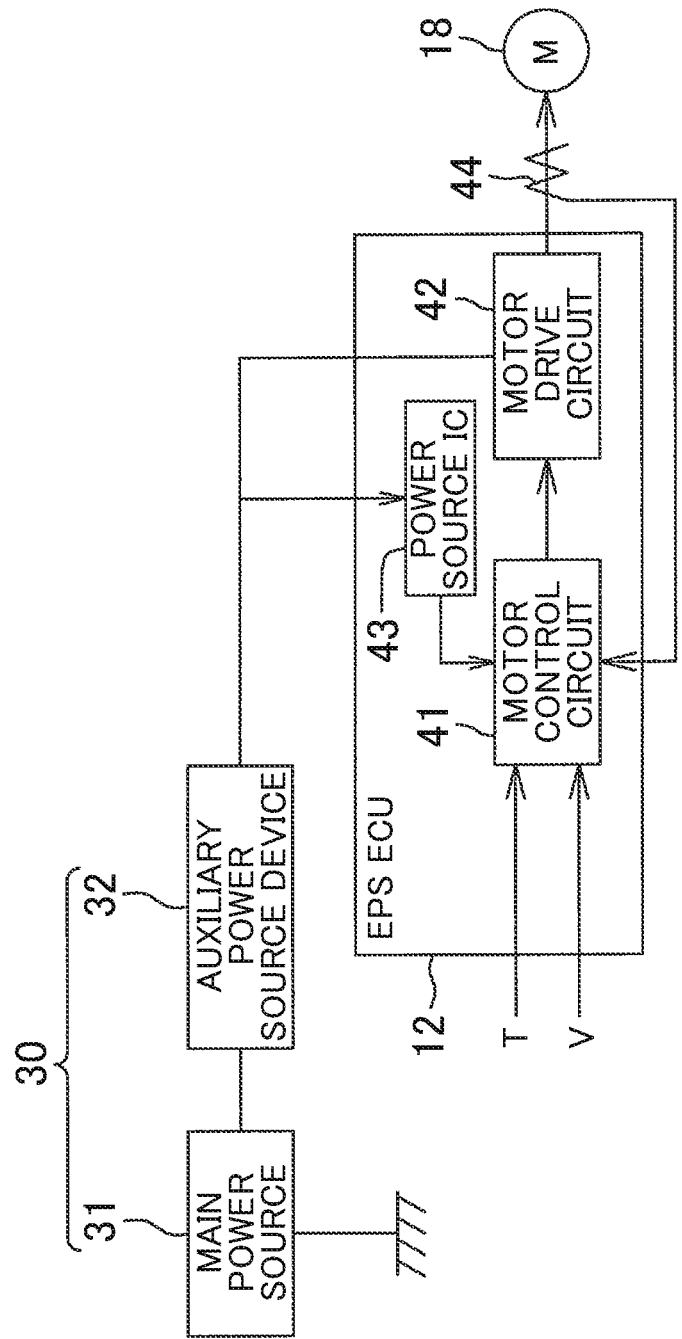

POWER SOURCE DEVICE

INCORPORATION BY REFERENCE

The disclosure of Japanese Patent Application No. 2018-025279 filed on Feb. 15, 2018 including the specification, drawings and abstract, is incorporated herein by reference in its entirety.

BACKGROUND OF THE INVENTION

1. Field of the Invention

The present invention relates to a power source device.

2. Description of the Related Art

Japanese Patent Application Publication No. 2014-91343 (JP 2014-91343 A) discloses a power supply device configured to supply power to a drive circuit for an electric motor for an electric power steering (EPS) system. The power supply device described in JP 2014-91343 A includes a main power source, a capacitor, a charge circuit, and a switching circuit (discharge circuit). The capacitor is connected to the main power source. The charge circuit charges the capacitor on the basis of the main power source. The switching circuit switches between a normal output voltage mode and a high output voltage mode. In the normal output voltage mode, power is supplied to the drive circuit by only the main power source. In the high output voltage mode, power is supplied to the drive circuit utilizing both the main power source and the capacitor through discharge of the capacitor.

In the power supply device described in JP 2014-91343 A, the switching circuit is controlled such that a power supply mode is set to the high output voltage mode when the power source power is equal to or more than a predetermined threshold. In this case, the capacitor is in a discharge state. On the other hand, the switching circuit is controlled such that the power supply mode is set to the normal output voltage mode when the power source power is less than the threshold. If the capacitor is not fully charged when the power source power is less than the threshold, the capacitor is charged.

In the case where a lithium ion capacitor is used as the capacitor, or a lithium ion battery is used in place of the capacitor, in the power supply device described in JP 2014-91343 A, power is gradually discharged because of a leakage current from a circuit element such as a switching element connected to the capacitor in the case where a key switch for the vehicle is in an off state. Therefore, the voltage of the capacitor is gradually lowered, and may eventually become lower than the lower limit of the operating voltage, degrading the capacitor.

SUMMARY OF THE INVENTION

It is an object of the present invention to provide a power source device that is capable of suppressing degradation of an auxiliary power source due to lowering of the voltage of the auxiliary power source in the case where a power source switch is in an off state.

An aspect of the present invention provides a power source device including: a drive circuit configured to supply power to an electric motor; a main power source; an auxiliary power source connected to the main power source via a power source switch; a charge circuit connected to the main power source via the power source switch and configured to charge the auxiliary power source on the basis of the main power source; a switching circuit that turns on and off power supply from the auxiliary power source to a load; and a control section that turns off the power source switch after the auxiliary power source is charged by the charge circuit until an amount of power stored in the auxiliary power source becomes equal to or more than a predetermined amount in the case where the amount of power stored in the auxiliary power source is less than the predetermined amount when a command to turn off the power source switch is input.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3 is a block diagram mainly illustrating the configuration of an EPS ECU;

DETAILED DESCRIPTION OF EMBODIMENTS

Figure 1:
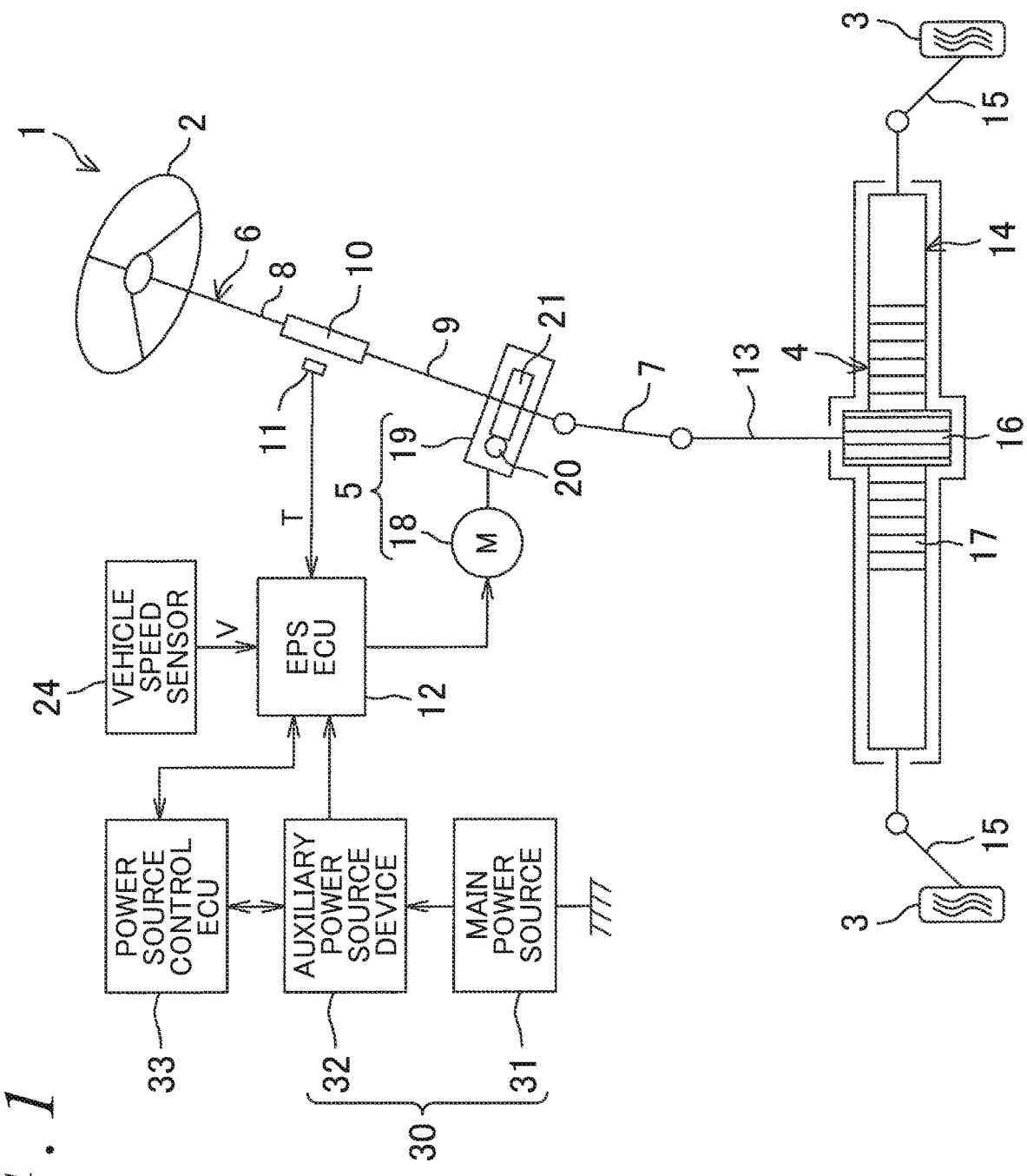
FIG. 1 is a schematic diagram illustrating a schematic configuration of an electric power steering system to which a power source device according to an embodiment of the present invention is applied.

An embodiment of the present invention will be described in detail below with reference to the accompanying drawings. FIG. 1 is a schematic diagram illustrating a schematic configuration of an electric power steering system to which a power source device according to an embodiment of the present invention is applied. An electric power steering system 1 includes a steering wheel 2, a steering operation mechanism 4, and a steering assist mechanism 5. The steering wheel 2 is a steering member configured to steer the vehicle. The steering operation mechanism 4 steers steered wheels 3 in conjunction with rotation of the steering wheel 2. The steering assist mechanism 5 assists a driver in steering. The steering wheel 2 and the steering operation mechanism 4 are mechanically coupled to each other via a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled so as to be rotatable relative to each other via a torsion bar 10. A torque sensor 11 is disposed in the vicinity of the torsion bar 10. The torque sensor 11 detects steering torque T applied to the steering wheel 2 on the basis of the amount of relative rotational displacement between the input shaft 8 and the output shaft 9. In the embodiment, the steering torque T which is detected by the torque sensor 11 is detected as a positive value when the vehicle is steered to the right, and as a negative value when the vehicle is steered to the left, for example. The magnitude of the steering torque T is larger as the absolute value of the positive or negative value is larger.

The steering operation mechanism 4 is composed of a rack-and-pinion mechanism that includes a pinion shaft 13 and a rack shaft 14 that serves as a steered shaft. The steered wheels 3 are coupled to end portions of the rack shaft 14 via tie rods 15 and knuckle arms (not illustrated). The pinion shaft 13 is coupled to the intermediate shaft 7. A pinion 16 is coupled to the distal end of the pinion shaft 13. The rack shaft 14 extends linearly along the right-left direction of the automobile. A rack 17 meshed with the pinion 16 is formed at an intermediate portion of the rack shaft 14 in the axial direction. The pinion 16 and the rack 17 convert rotation of the pinion shaft 13 into movement of the rack shaft 14 in the axial direction. The steered wheels 3 can be steered by moving the rack shaft 14 in the axial direction.

When the steering wheel 2 is operated (rotated), rotation of the steering wheel 2 is transferred to the pinion shaft 13 via the steering shaft 6 and the intermediate shaft 7. The pinion 16 and the rack 17 convert rotation of the pinion shaft 13 into movement of the rack shaft 14 in the axial direction. Consequently, the steered wheels 3 are steered. The steering assist mechanism 5 includes an electric motor 18 for steering assist, and a speed reducer 19 configured to transfer output torque from the electric motor 18 to the steering shaft 6. The speed reducer 19 is composed of a worm gear mechanism that includes a worm gear 20 and a worm wheel 21 meshed with the worm gear 20.

The worm gear 20 is rotationally driven by the electric motor 18. The worm wheel 21 is coupled so as to be rotatable together with the steering shaft 6. The worm wheel 21 is rotationally driven by the worm gear 20. When the worm gear 20 is rotationally driven by the electric motor 18, the worm wheel 21 is rotationally driven to rotate the steering shaft 6. That is, the worm gear 20 is rotationally driven by the electric motor 18. Consequently, steering assist by the electric motor 18 is enabled.

The vehicle is provided with a vehicle speed sensor 24 configured to detect a vehicle speed V. The steering torque T which is detected by the torque sensor 11, the vehicle speed V which is detected by the vehicle speed sensor 24, and so forth are input to an EPS electronic control unit (ECU) 12. The EPS ECU 12 performs so-called assist control by controlling the electric motor 18 on the basis of such inputs.

Power is supplied to a motor drive circuit 42 and a power source IC 43 (see FIG. 3) in the EPS ECU 12 by one or both of a main power source 31 and an auxiliary power source 55 (see FIG. 2) in an auxiliary power source device 32. The auxiliary power source device 32 is controlled by a power source control ECU 33. The EPS ECU 12 and the power source control ECU 33 are connected to each other via a communication line. The main power source 31 and the auxiliary power source device 32 constitute a power source device 30.

Figure 2:
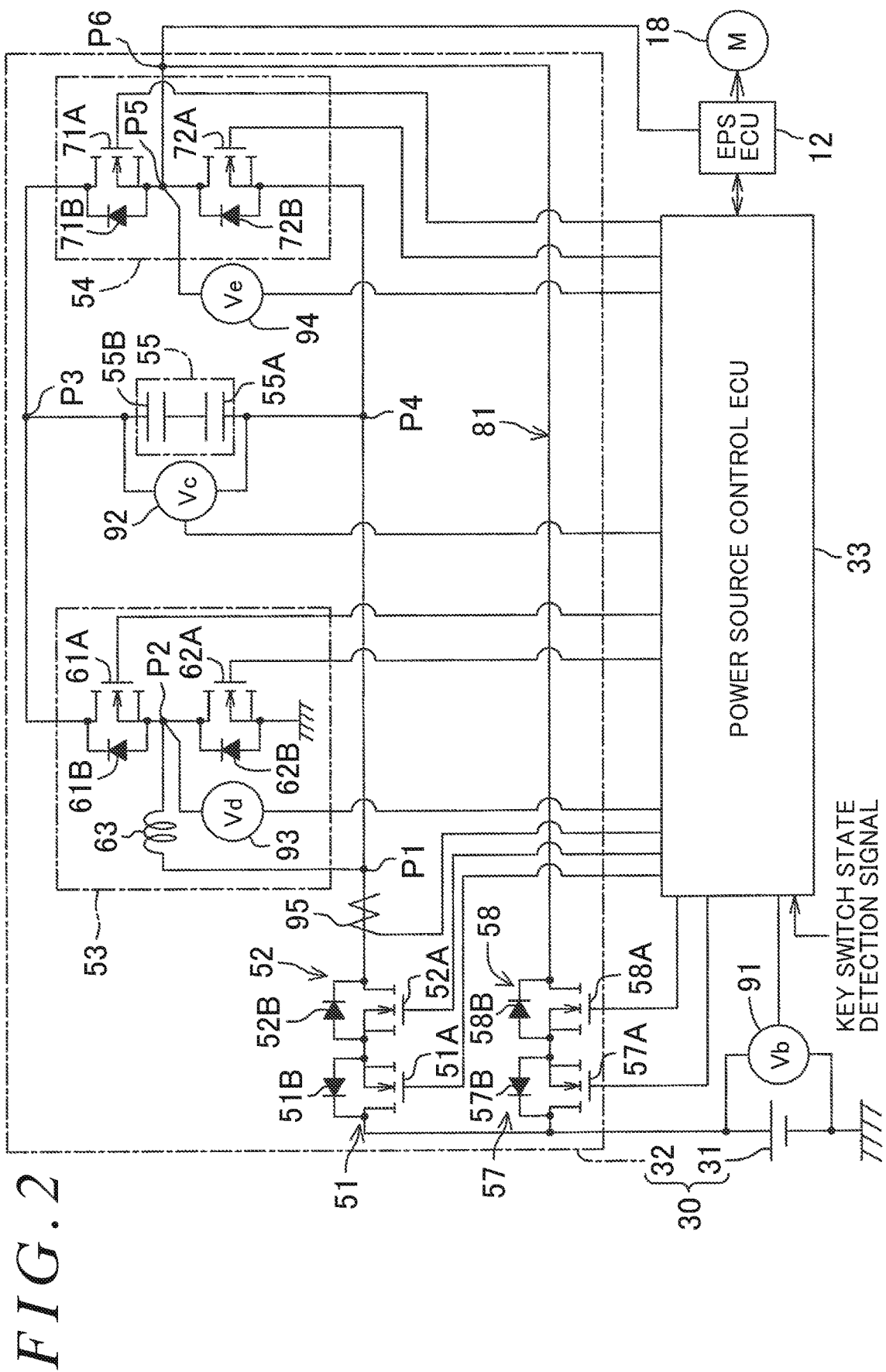
FIG. 2 is a circuit diagram illustrating the electrical configuration of the electric power steering system in FIG. 1.

FIG. 2 is a circuit diagram illustrating the electrical configuration of the electric power steering system 1. FIG. 3 is a block diagram mainly illustrating the configuration of the EPS ECU 12. With reference to FIG. 3, the EPS ECU 12 includes a motor control circuit 41, the motor drive circuit (inverter circuit) 42, and the power source IC 43. The motor control circuit 41 is composed of a microcomputer. The motor drive circuit 42 is controlled by the motor control circuit 41, and supplies power to the electric motor 18. The power source IC 43 generates power for the motor control circuit 41. The EPS ECU 12 receives an output signal from a current sensor 44 configured to detect a motor current that flows through the electric motor 18.

The motor control circuit 41 controls drive of the motor drive circuit 42 on the basis of the steering torque T which is detected by the torque sensor 11, the vehicle speed V which is detected by the vehicle speed sensor 24, and the motor current which is detected by the current sensor 44. Specifically, the motor control circuit 41 sets a target current value on the basis of the steering torque T and the vehicle speed V, and controls the drive of the motor drive circuit 42 such that the motor current which flows through the electric motor 18 is equal to the target current value.

With reference to FIG. 2, the auxiliary power source device 32 is connected in series with the main power source 31. The auxiliary power source device 32 includes a power source relay (power source switch) 51, a first reverse connection protection relay 52, a charge circuit 53, a discharge circuit (switching circuit) 54, the auxiliary power source 55, a bypass relay (bypass switch) 57, and a second reverse connection protection relay 58. The power source relay 51 and the first reverse connection protection relay 52 are disposed between the positive terminal of the main power source 31 and the charge circuit 53. When the point of connection between the first reverse connection protection relay 52 and the charge circuit 53 is defined as P1, the first reverse connection protection relay 52 is connected between the power source relay 51 and the point of connection P1. The power source relay 51 is composed of a switching element 51A and a diode 51B connected in parallel with switching element 51A in the direction opposite to the main power source 31. In the embodiment, the power source relay 51 is composed of an n-channel metal oxide semiconductor field effect transistor (MOSFET) with the built-in diode 51B.

The first reverse connection protection relay 52 is a relay configured to protect a circuit in the case where the main power source 31 is connected in reverse by mistake. The first reverse connection protection relay 52 is composed of a switching element 52A and a diode 52B. The diode 52B is connected in parallel with the switching element 52A in the forward direction with respect to the main power source 31 which is connected correctly. In the embodiment, the first reverse connection protection relay 52 is composed of an n-channel MOSFET with the built-in diode 52B.

The charge circuit 53 is a circuit configured to charge the auxiliary power source 55. The charge circuit 53 includes a pair of switching elements 61A and 62A connected in series with each other and a voltage boosting coil 63. The voltage boosting coil 63 is connected between a point of connection P2 between the switching elements 61A and 62A and the point of connection P1. A diode 61B is connected in parallel with the upper switching element 61A in the forward direction with respect to the main power source 31 (in the direction opposite to the auxiliary power source 55). A diode 62B is connected in parallel with the lower switching element 62A in the direction opposite to the main power source 31. In the embodiment, the switching element 61A, 62A is composed of an n-channel MOSFET with the built-in diode 61B, 62B, respectively.

The source of the upper switching element 61A is connected to the drain of the lower switching element 62A at the point of connection P2. The source of the lower switching element 62A is grounded. The drain of the upper switching element 61A is connected to the output terminal of the auxiliary power source 55. The point of connection between the upper switching element 61A and the output terminal of the auxiliary power source 55 is denoted by P3. The output terminal of the auxiliary power source 55 is connected to the point of connection P1 via the switching element 61A and the voltage boosting coil 63. The point of connection between the point of connection P1 and the input terminal of the auxiliary power source 55 is denoted by P4.

The auxiliary power source 55 is composed of a first capacitor 55A and a second capacitor 55B connected in series with the first capacitor 55A. In the embodiment, the capacitors 55A and 55B are each composed of lithium ion capacitor cells. A terminal (input terminal) of the auxiliary power source 55 on the side of the first capacitor 55A is connected to the point of connection P4. A terminal (output terminal) of the auxiliary power source 55 on the side of the second capacitor 55B is connected to the point of connection P3.

The discharge circuit 54 is connected between the point of connection P3 and the point of connection P4. The discharge circuit 54 is composed of a pair of switching elements 71A and 72A connected in series with each other. A diode 71B is connected in parallel with the upper switching element 71A in the direction opposite to the auxiliary power source 55. A diode 72B is connected in parallel with the lower switching element 72A in the forward direction with respect to the main power source 31. In the embodiment, the switching element 71A, 72A is composed of an n-channel MOSFET with the built-in diode 71B, 72B, respectively.

The source of the upper switching element 71A is connected to the drain of the lower switching element 72A at a point of connection P5. The drain of the upper switching element 71A is connected to the point of connection P3. The source of the lower switching element 72A is connected to the point of connection P4. The point of connection P5 between the pair of switching elements 71A and 72A is connected to the motor drive circuit 42 and the power source IC 43 in the EPS ECU 12.

In the embodiment, a bypass circuit 81 is provided so that power can be supplied to the EPS ECU 12 also in the case where a failure (abnormality) is caused in the auxiliary power source device 32. Examples of the failure (abnormality) in the auxiliary power source device 32 include a failure (abnormality) in the power source relay 51, the first reverse connection protection relay 52, the switching elements 61A and 62A in the charge circuit 53, the switching elements 71A and 72A in the switching circuit 54, and so forth. The bypass circuit 81 electrically connects the main power source 31 and the EPS ECU 12 to each other via the bypass relay 57 and the second reverse connection protection relay 58.

One end of the bypass circuit 81 is connected to the positive terminal of the main power source 31. The other end of the bypass circuit 81 is connected to a connection line that connects the point of connection P5 and the EPS ECU 12 to each other. The point of connection between the connection line which connects the point of connection P5 and the EPS ECU 12 to each other and the other end of the bypass circuit 81 is denoted by P6. The bypass relay 57 is composed of a switching element 57A and a diode 57B. The diode 57B is connected in parallel with the switching element 57A in the direction opposite to the main power source 31. In the embodiment, the switching element 57A is composed of an n-channel MOSFET with the built-in diode 57B. The drain of the switching element 57A is connected to the positive terminal of the main power source 31.

The second reverse connection protection relay 58 is connected between the bypass relay 57 and the point of connection P6. The second reverse connection protection relay 58 is a relay configured to protect a circuit in the case where the main power source 31 is connected in reverse by mistake. The second reverse connection protection relay 58 is composed of a switching element 58A and a diode 58B. The diode 58B is connected in parallel with the switching element 58A in the forward direction with respect to the main power source 31 which is connected correctly. In the embodiment, the switching element 58A is composed of an n-channel MOSFET with the built-in diode 58B. The source of the switching element 58A is connected to the source of the switching element 57A. The drain of the switching element 58A is connected to the point of connection P6.

A terminal voltage (main power source voltage Vb) of the main power source 31 is detected by a first voltage sensor 91. A terminal voltage (auxiliary power source voltage Vc) of the auxiliary power source 55 is detected by a second voltage sensor 92. A voltage (charge middle point voltage Vd) at the point of connection P2 is detected by a third voltage sensor 93. A voltage (discharge middle point voltage Ve) at the point of connection P5 is detected by a fourth voltage sensor 94. An output current (main power source current ib) from the main power source 31 is detected by a current sensor 95.

The detection values from the voltage sensors 91 to 94 and the detection value from the current sensor 95 are input to the power source control ECU 33. A key switch state detection signal that indicates the state of a key switch for the vehicle is input to the power source control ECU 33. In the embodiment, the key switch for the vehicle is an ignition key for starting an engine (not illustrated). Besides the ignition key, the key switch may be a switch that issues an electric signal in the case where authentication is made using an electronic key provided with an immobilizer, or a switch that issues an electric signal using a push button.

The power source control ECU 33 includes a plurality of gate drive circuits (not illustrated) configured to drive the relays 51, 52, 57, and 58 and the switching elements 61A, 62A, 71A, and 72A, respectively, and a microcomputer (not illustrated). The microcomputer performs a power source control process. Specifically, the microcomputer controls the plurality of gate drive circuits on the basis of the key switch state detection signal, the detection values from the voltage sensors 91 to 94, the detection value from the current sensor 95, and so forth.

Operation of the power source control ECU 33 will be described in detail below. When the key switch is operated to be turned on, a key switch state detection signal that indicates that the key switch has been turned on (hereinafter referred to as a "key switch on state signal") is input to the power source control ECU 33. The key switch on state signal is an example of a command for turning off a power source switch. When the key switch on state signal is input, the power source control ECU 33 performs initial setting. Specifically, the power source control ECU 33 turns off the bypass relay 57, the second reverse connection protection relay 58, and the switching elements 61A, 62A, and 71A, and turns on the power source relay 51, the first reverse connection protection relay 52, and the switching element 72A. Regarding the switching elements 71A and 72A, the switching element 72A may be turned off, and the switching element 71A may be turned on.

After the initial setting, the power source control ECU 33 controls on and off the four switching elements 61A, 62A, 71A, and 72A in the auxiliary power source device 32 on the basis of the detection values from the voltage sensors 91 to 94, the current sensor 95, and so forth. The power source control ECU 33 monitors whether or not a failure is caused in the auxiliary power source device 32 on the basis of the detection values from the voltage sensors 91 to 94, the current sensor 95, and so forth. A failure in the auxiliary power source device 32 may be monitored by monitoring a failure (abnormality) in at least one of the charge circuit 53 and the discharge circuit 54.

The power source control ECU 33 controls the four switching elements 61A, 62A, 71A, and 72A on the basis of a value that matches power supplied by the EPS ECU 12 to the electric motor 18. Specifically, the power source control ECU 33 controls the four switching elements 61A, 62A, 71A, and 72A on the basis of main power source power PS. The main power source power PS is the actual power of the main power source 31 consumed by the EPS ECU 12 to drive the electric motor 18. The main power source power PS is calculated by computing the product of the main power source current ib which is detected by the current sensor 95 and the main power source voltage Vb which is detected by the first voltage sensor 91.

More specifically, when the main power source power PS is less than an output voltage switching threshold KE determined in advance, the power source control ECU 33 sets off the upper switching element 71A in the discharge circuit 54, and sets on the lower switching element 72A, for example. Consequently, power is supplied to the motor drive circuit 42 by only the main power source 31. A power supply mode (power supply state) in which power is supplied to the EPS ECU 12 by only the main power source 31 in this way is occasionally referred to as a "normal output voltage mode (normal output voltage state)".

When the main power source power PS is less than the output voltage switching threshold KE, the power source control ECU 33 alternately turns on the pair of switching elements 61A and 62A in the charge circuit 53 as necessary. Consequently, the output voltage (main power source voltage) at the point of connection P1 is raised and applied to the auxiliary power source 55. Consequently, the auxiliary power source 55 (the first capacitor 55A and the second capacitor 55B) is charged.

When the main power source power PS is not less than the output voltage switching threshold KE, the power source control ECU 33 brings the pair of switching elements 61A and 62A in the charge circuit 53 into an off state. The power source control ECU 33 sets on the upper switching element 71A in the discharge circuit 54, and sets off the lower switching element 72A. Consequently, power is supplied to the motor drive circuit 42 by both the main power source 31 and the auxiliary power source 55. In this case, a voltage obtained by adding the voltage of the auxiliary power source 55 to the voltage of the main power source 31 is applied to the moto drive circuit 42.

The power source control ECU 33 may alternately turn on the pair of switching elements 71A and 72A in the discharge circuit 54 when the main power source power PS is not less than the output voltage switching threshold KE. Also in this case, power is supplied to the motor drive circuit 42 by both the main power source 31 and the auxiliary power source 55. A power supply mode (power supply state) in which power is supplied to the EPS ECU 12 utilizing both the main power source 31 and the auxiliary power source 55 in this way is occasionally referred to as a "high output voltage mode (high output voltage state)".

In the case where a failure in the auxiliary power source device 32 is detected, the power source control ECU 33 turns off the power source relay 51, the first reverse connection protection relay 52, and the switching elements 61A, 62A, 71A, and 72A, and turns on the bypass relay 57 and the second reverse connection protection relay 58. When the key switch is operated to be turned off, a key switch state detection signal that indicates that the key switch has been turned off (hereinafter referred to as a "key switch off state signal") is input to the power source control ECU 33. When the key switch off state signal is input, the power source control ECU 33 determines whether or not the amount of power stored in the auxiliary power source 55 is less than a predetermined amount. In the embodiment, whether or not the amount of power stored in the auxiliary power source 55 is less than the predetermined amount is determined by determining whether or not the auxiliary power source voltage Vc is less than a predetermined charge determination threshold Vth2 (Vth2>0) to be discussed later.

If the auxiliary power source voltage Vc is not less than the charge determination threshold Vth2 (the amount of power stored in the auxiliary power source is not less than the predetermined amount), the power source control ECU 33 turns off the power source relay 51, the first reverse connection protection relay 52, the bypass relay 57, the second reverse connection protection relay 58, and the switching elements 61A, 62A, 71A, and 72A. If the auxiliary power source voltage Vc is less than the charge determination threshold Vth2 (the amount of power stored in the auxiliary power source is less than the predetermined amount), the power source control ECU 33 turns off the relays 51, 52, 57, and 58 and the switching elements 61A, 62A, 71A, and 72A after the auxiliary power source 55 is charged until the auxiliary power source voltage Vc becomes equal to or more than the charge determination threshold Vth2.

Figure 4A:
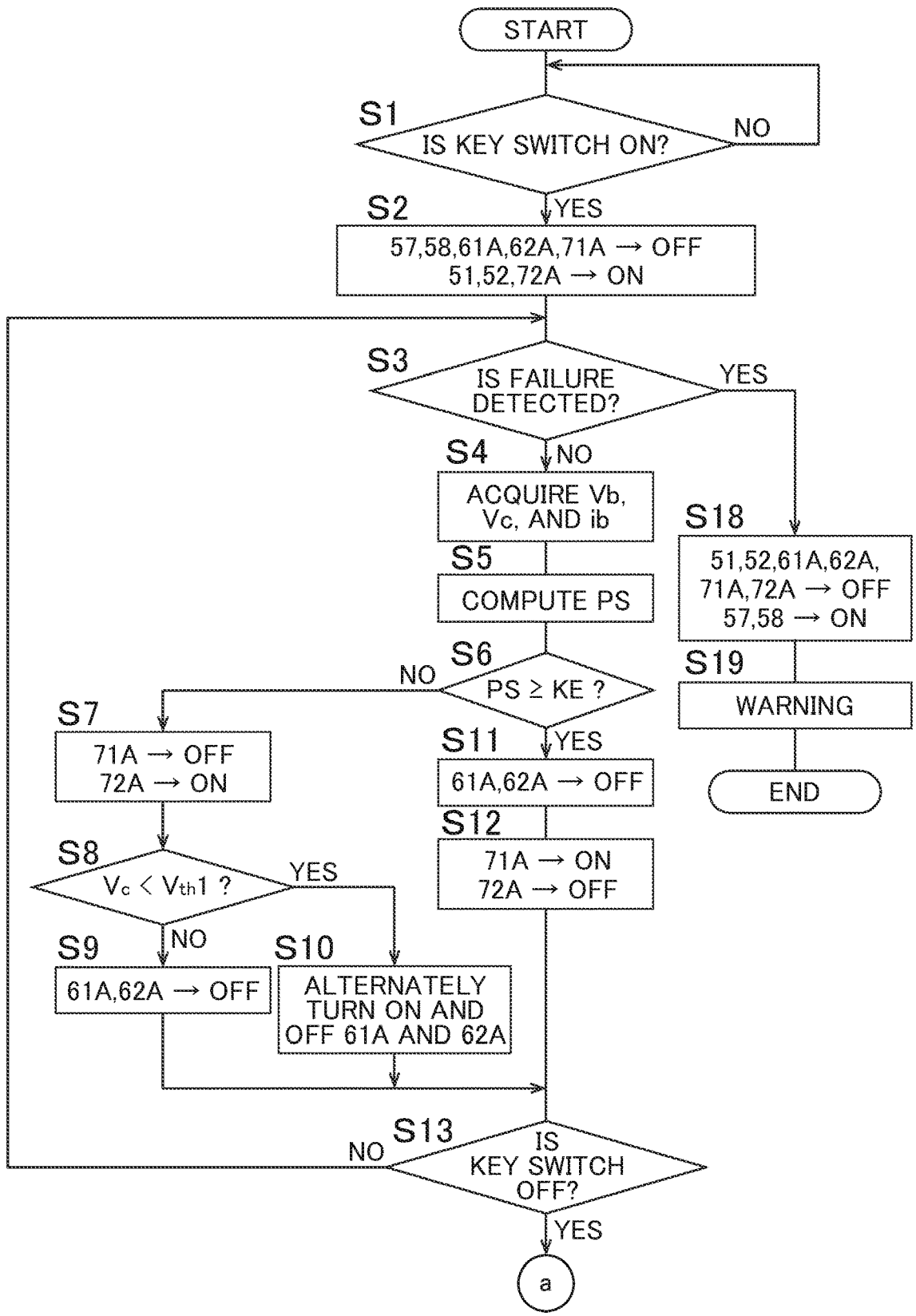
FIG. 4A is a part of a flowchart illustrating an operation of a power source control ECU.
Figure 4B:
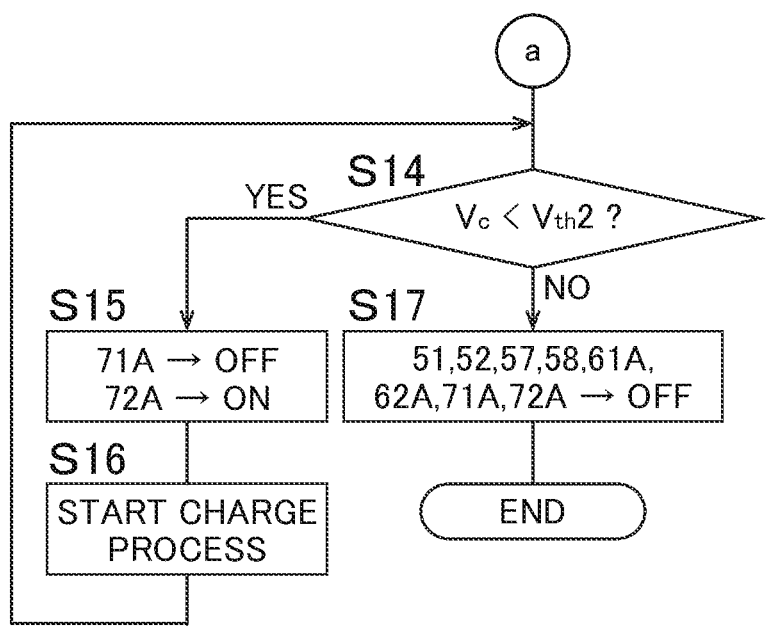
FIG. 4B is a part of the flowchart illustrating the operation of the power source control ECU.

FIGS. 4A and 4B are each a flowchart illustrating the operation of the power source control ECU 33. When a key switch on state signal is input (step S1: YES), the power source control ECU 33 performs initial setting (step S2). In the initial setting, the power source control ECU 33 turns off the bypass relay 57, the second reverse connection protection relay 58, and the switching elements 61A, 62A, and 71A, and turns on the power source relay 51, the first reverse connection protection relay 52, and the switching element 72A. Consequently, the power supply mode is brought into the normal output voltage mode.

Regarding the switching elements 71A and 72A, as discussed earlier, the switching element 72A may be turned off, and the switching element 71A may be turned on. In such a case, the power supply mode is brought into the high output voltage mode. Next, the power source control ECU 33 determines whether or not a failure in the auxiliary power source device 32 is detected (step S3). In the case where a failure in the auxiliary power source device 32 is not detected (step S3: NO), the power source control ECU 33 acquires the main power source voltage Vb which is detected by the first voltage sensor 91, the auxiliary power source voltage Vc which is detected by the second voltage sensor 92, and the main power source current ib which is detected by the current sensor 95 (step S4).

Next, the power source control ECU 33 computes the main power source power PS by multiplying the main power source voltage Vd and the main power source current ib which are acquired in step S4 (step S5). Then, the power source control ECU 33 determines whether or not the main power source power PS is equal to or more than the output voltage switching threshold KE (step S6). In the case where the main power source power PS is less than the output voltage switching threshold KE (step S6: NO), the power source control ECU 33 sets off the upper switching element 71A in the discharge circuit 54, and sets on the lower switching element 72A (step S7). Consequently, discharge of the auxiliary power source 55 is stopped in the case where such discharge is executed. Consequently, the power supply mode is brought to the normal output voltage mode.

After that, the power source control ECU 33 determines whether or not the auxiliary power source voltage Vc is less than a predetermined charge determination threshold Vth1 (Vth1>0) (step S8). This determination is made in order to prevent the auxiliary power source 55 from being overcharged. The charge determination threshold Vth1 is set to a value that is equal to or slightly smaller than the upper limit voltage of the auxiliary power source 55. In the case where the auxiliary power source voltage Vc is not less than the charge determination threshold Vth1 (step S8: NO), the power source control ECU 33 sets off both the two switching elements 61A and 62A in the charge circuit 53 (step S9). Then, the power source control ECU 33 determines whether or not a key switch off state signal is input (step S13). If a key switch off state signal is not input (step S13: NO), the power source control ECU 33 returns to step S3.

In the case where it is determined in step S8 that the auxiliary power source voltage Vc is less than the charge determination threshold Vth1 (step S8: YES), the power source control ECU 33 starts a charge process for the auxiliary power source 55 (step S10). Specifically, the power source control ECU 33 alternately turns on and off the pair of switching elements 61A and 62A in the charge circuit 53 to generate a boosted voltage at the point of connection P3. Consequently, the auxiliary power source 55 is charged. In the case where a charge process has already been started when a transition is made from step S8 to step S10, the power source control ECU 33 continuously performs the charge process.

After that, the power source control ECU 33 transitions to step S13, and determines whether or not a key switch off state signal is input. If a key switch off state signal is not input (step S13: NO), the power source control ECU 33 returns to step S3. In the case where it is determined in step S6 that the main power source power PS is equal to or more than the output voltage switching threshold KE (step S6: YES), the power source control ECU 33 sets off both the two switching elements 61A and 62A in the charge circuit 53 (step S11). Consequently, the charge process is stopped in the case where the charge process is being executed.

Next, the power source control ECU 33 sets on the upper switching element 71A in the discharge circuit 54, and sets off the lower switching element 72A (step S12). Consequently, the power supply mode is brought into the high output voltage mode. After that, the power source control ECU 33 transitions to step S13, and determines whether or not a key switch off state signal is input. If a key switch off state signal is not input (step S13: NO), the power source control ECU 33 returns to step S3.

In the case where it is determined in step S13 that a key switch off state signal is input (step S13: YES), the power source control ECU 33 proceeds to step S14. In step S14, the power source control ECU 33 determines whether or not the auxiliary power source voltage Vc is less than the charge determination threshold Vth2 (Vth2>0). The charge determination threshold Vth2 may be the same value as the charge determination threshold Vth1. If the auxiliary power source voltage Vc is not less than the charge determination threshold Vth2 (step S14: NO), the power source control ECU 33 turns off the power source relay 51, the first reverse connection protection relay 52, the bypass relay 57, the second reverse connection protection relay 58, and the switching elements 61A, 62A, 71A, and 72A (step S17). Then, the power source control ECU 33 ends the current power source control process.

In the case where it is determined in step S14 that the auxiliary power source voltage Vc is less than the charge determination threshold Vth2 (step S14: YES), the power source control ECU 33 sets off the upper switching element 71A in the discharge circuit 54, and sets on the lower switching element 72A (step S15). Consequently, discharge of the auxiliary power source 55 is stopped in the case where such discharge is executed. Then, the power source control ECU 33 starts a charge process for the auxiliary power source 55 (step S16). Specifically, the power source control ECU 33 alternately turns on the pair of switching elements 61A and 62A in the charge circuit 53. Consequently, the auxiliary power source 55 is charged. In the case where a charge process has already been started when a transition is made from step S15 to step S16, the power source control ECU 33 continuously performs the charge process. After that, the power source control ECU 33 returns to step S14.

Thus, in the case where it is determined in step S14 that the auxiliary power source voltage Vc is less than the charge determination threshold Vth2, the auxiliary power source 55 is charged until the auxiliary power source voltage Vc becomes equal to or more than the charge determination threshold Vth2. After that, the power source relay 51, the first reverse connection protection relay 52, the bypass relay 57, the second reverse connection protection relay 58, and the switching elements 61A, 62A, 71A, and 72A are turned off.

In the case where it is determined in step S3 that a failure in the auxiliary power source device 32 is detected (step S3: NO), the power source control ECU 33 transitions to step S18. In step S18, the power source control ECU 33 turns off the power source relay 51, the first reverse connection protection relay 52, and the switching elements 61A, 62A, 71A, and 72A, and turns on the bypass relay 57 and the second reverse connection protection relay 58. The power source control ECU 33 displays on a display device (not illustrated) a warning that an assist force may be lowered (step S19). Then, the power source control ECU 33 ends the power source control process.

In the embodiment, power can be supplied from the main power source 31 to the EPS ECU 12 via the bypass circuit 81 also when a failure in the auxiliary power source device 32 is detected during operation of the electric power steering system 1. Consequently, it is possible to continuously provide steering assist also in the case where a failure is caused in the auxiliary power source device 32. In the embodiment discussed earlier, when the key switch for the vehicle is turned off, it is determined whether or not the auxiliary power source voltage Vc is less than the charge determination threshold Vth2. Then, in the case where the auxiliary power source voltage Vc is less than the charge determination threshold Vth2, the power source relay 51 etc. are turned off after the auxiliary power source 55 is charged until the auxiliary power source voltage Vc becomes equal to or more than the charge determination threshold Vth2. Thus, it is possible to suppress degradation of the auxiliary power source 55 due to lowering of the voltage of the auxiliary power source 55 in the case where the key switch for the vehicle is in an off state (in the case where the power source relay 51 is in an off state).

While an embodiment of the present invention has been described above, the present invention may be implemented in other embodiments. In the embodiment discussed earlier, switching is made between the normal output voltage mode and the high output voltage mode on the basis of whether or not the main power source power PS is equal to or more than the output voltage switching threshold KE. However, switching may be made between the normal output voltage mode and the high output voltage mode on the basis of whether or not the power consumption by the EPS ECU 12

(power consumption by the motor drive circuit 42) is equal to or more than a predetermined output voltage switching threshold.

In the embodiment discussed earlier, the auxiliary power source is constituted from two capacitors. However, the auxiliary power source may be constituted from one capacitor, or may be constituted from three or more capacitors. The auxiliary power source may be constituted from one or a plurality of power source elements other than the capacitors. Examples of the power source elements other than the capacitors include lithium-ion batteries. In the embodiment discussed earlier, the present invention is applied to an electric power steering system. However, the present invention is also applicable to any power steering system that includes an electric motor, such as a hydraulic power steering system of an electric pump type, other than an electric power steering system. Besides the power steering systems, the present invention is also applicable to power source devices that supply power to power sources such as actuators for vehicles such as automobiles and railway vehicles and actuators as drive sources for machine tools, for example.

Besides, a variety of design changes may be made without departing from the scope defined in the claims.

What is claimed is:

1. A power source device comprising:
   a drive circuit configured to supply power to an electric motor;
   a main power source;
   an auxiliary power source connected to the main power source via a power source switch;
   a charge circuit connected to the main power source via the power source switch and configured to charge the auxiliary power source on the basis of the main power source;
   a switching circuit that turns on and off power supply from the auxiliary power source to a load; and
   a control section that turns off the power source switch after the auxiliary power source is charged by the charge circuit until an amount of power stored in the auxiliary power source becomes equal to or more than a predetermined amount in the case where the amount of power stored in the auxiliary power source is less than the predetermined amount when a command to turn off the power source switch is input.

2. The power source device according to claim 1, wherein the auxiliary power source is a lithium ion capacitor.

3. The power source device according to claim 2, wherein the auxiliary power source is constituted from a plurality of lithium ion capacitor cells connected in series with each other.

4. The power source device according to claim 1, further comprising:
   a bypass circuit that electrically connects the main power source and the drive circuit to each other via a bypass switch; and
   a unit that turns on the bypass switch when an abnormality is caused in at least one of the charge circuit and the switching circuit.

5. The power source device according to claim 2, further comprising:
   a bypass circuit that electrically connects the main power source and the drive circuit to each other via a bypass switch; and
   a unit that turns on the bypass switch when an abnormality is caused in at least one of the charge circuit and the switching circuit.

6. The power source device according to claim 3, further comprising:
   a bypass circuit that electrically connects the main power source and the drive circuit to each other via a bypass switch; and
   a unit that turns on the bypass switch when an abnormality is caused in at least one of the charge circuit and the switching circuit.

\* \* \* \* \*